United States Patent [19]
Fukuyama et al.

[11] Patent Number: 5,483,352
[45] Date of Patent: Jan. 9, 1996

[54] COMPUTER ABLE TO LINK ELECTRONIC MAIL FUNCTIONS WITH TELEPHONE FUNCTIONS

[75] Inventors: Noriyuki Fukuyama; Masahiro Matsuda, both of Kawasaki, Japan

[73] Assignee: Fujitsu Limited, Kanagawa, Japan

[21] Appl. No.: 112,071

[22] Filed: Aug. 26, 1993

[30]   Foreign Application Priority Data

Aug. 27, 1992  [JP]  Japan ................... 4-228558

[51] Int. Cl.⁶ .................................... H04N 1/00
[52] U.S. Cl. .................... 358/402; 358/440; 358/444; 379/93; 379/355
[58] Field of Search ............... 379/93, 100, 67, 379/355; 358/400, 442, 440, 434, 468, 402, 403, 404, 407, 444, 435, 439

[56]      References Cited

U.S. PATENT DOCUMENTS

| 5,111,326 | 5/1992 | Burgess et al. | 358/402 |
| 5,315,640 | 5/1994 | Takayama et al. | 379/93 |

Primary Examiner—Scott A. Rogers
Assistant Examiner—Fan Lee
Attorney, Agent, or Firm—Nikaido, Marmelstein, Murray & Oram

[57]              ABSTRACT

In a computer linked to a terminal display, and an input device such as a keyboard, being able to transmit and receive electronic mail by using a transmitting and receiving part for transmitting and receiving electronic mail consists of a random access memory for storing received electronic mail, a display controller for displaying the contents of an electronic mail stored in the memory originally provided in the computer, and a linkage function to a telephone exchange for automatically connecting an own telephone to the telephone of a sender of electronic mail by using a part of the data, for example, a telephone number, in the received electronic mail when a telephone connection request is input to the computer by the receiver of the electronic mail. The linkage function part includes a memory for storing an own telephone number, a reading or retrieving part for obtaining a sender's telephone number, and a controller for controlling a telephone exchange to connect the own telephone and the sender's telephone.

16 Claims, 12 Drawing Sheets

TERMINAL DISPLAY

TO: XYZ @ flab. DEF. Co. jp
FROM: abc @ flab. ABC Co. jp
SUBJECT: PLEASE REPLY ASAP MR. XYZ, I MUST SEND YOU ELECTRONIC
MAIL BECAUSE YOU ARE NOT AT HOME WHEN
I CALL YOU. I WANT TO CONSULT WITH YOU
ABOUT PROJECT A. PLEASE CALL ME AT ONCE.

FROM abc

Fig.8B

| ELECTRONIC MAIL ID | | TELEPHONE NO. | EXTENSION NO. |
|---|---|---|---|
| aaa @ flab. | ABC. Co. jp | 012-9876 | |
| abc @ flab. | ABC. Co. jp | 123-4567 | |
| cdy @ flab. | STA. Co. Ep | 851-6231 | |
| def @ flab. | BBC. Co. jp | 813-4213 | |
| SSX C flab. | DEF. Co. jp | | 3120 |
| RHE OO XXX. | | 584-8763 | |

COMPUTER ABLE TO LINK ELECTRONIC MAIL FUNCTIONS WITH TELEPHONE FUNCTIONS

BACKGROUND OF THE INVENTION

1. Field of the Invention

The present invention relates to a computer able to link electronic mail functions with telephone functions, particularly the present invention relates to a computer able to connect the telephone of a receiver of electronic mail (text mail) to the telephone of a sender of electronic mail by dialing the sender's telephone number after retrieving the telephone number from the electronic mail or from the memory of the computer.

2. Description of the Related Art

In recent years, the number of users of electronic mail using a computer network has increased in step with the down-sizing of computer equipment and the increase in use of computer networks. Electronic mail can be printed, read, filed, forwarded to other individuals, perhaps with added comments, or read by the addressee at various locations. It is clear that such a service has many advantages over postal mail in terms of delivery speed and flexibility. In comparison with facsimile, which has also become very popular in recent years, electronic mail is more economical, has the advantage of flexibility as mentioned above, and is in principle more convenient as the data can be easily stored in a computer.

However, when a receiver of electronic mail is going to reply to the sender with electronic mail, that is, to reply via the keyboard, there the are the following problems: input of the message by a keyboard is a nuisance; the message may not actually express what the replyer wants to say; and the reply is not immediately delivered to the sender of electric mail. For any of these reasons, electronic mail is not always the best means for replying to electronic mail.

Accordingly, it is sometimes necessary to contact the sender of electronic mail by telephone. When the replyer wants to dial the sender's number, the replyer examines the telephone number written on the received electronic mail.

Figure 1:
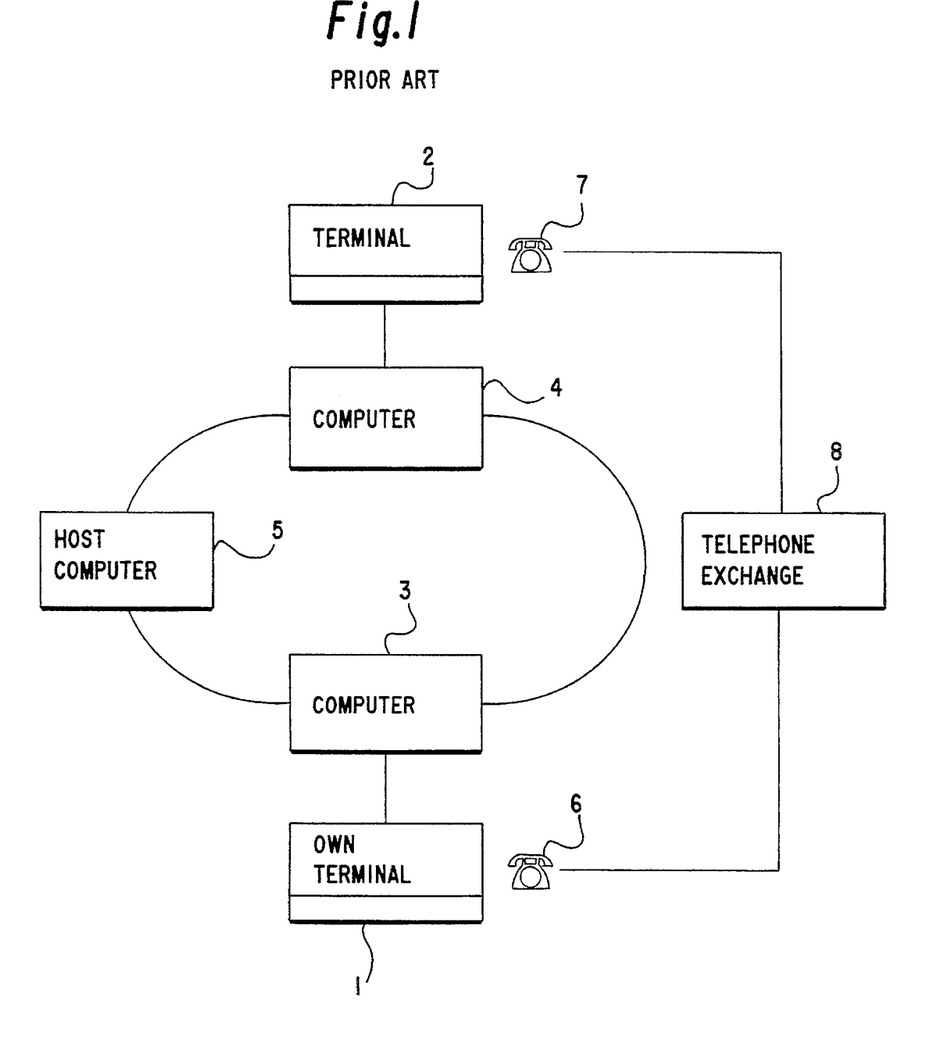
FIG. 1 is a block diagram of one example of a conventional electronic mail system using a computer system.

FIG. 1 shows one example of a conventional electronic mail system using a computer system. In FIG. 1, reference numerals 1 denotes a first terminal at which electronic mail will be received, 2 denotes a second terminal from which electronic mail will be transmitted, 3 and 4 denote computers, 5 denotes a host computer forming a LAN (Local Area Network) with the computers 3 and 4, 6 denotes a first telephone provided near the first terminal 1, 7 denotes a second telephone provided near the second terminal 2, and 8 denotes a telephone company exchange.

In the system shown in FIG. 1, electronic mail (text mail) is transmitted and received between the first terminal and the second terminal via the computer 3, 4, and 5. When a user at terminal 2 (remote terminal) transmits electronic mail, and a user at terminal 1 (own terminal) 1 receives the same, the electronic mail is displayed on the display of the first terminal 1.

The receiver of the electronic mail dials the telephone number of the sender after reading the telephone number shown on the terminal display. That is, the receiver of the electronic mail at the own terminal 1 dials from the first telephone 6 to call the second telephone 7, and discusses the content of the electronic mail via a voice telephone service.

Figure 2:
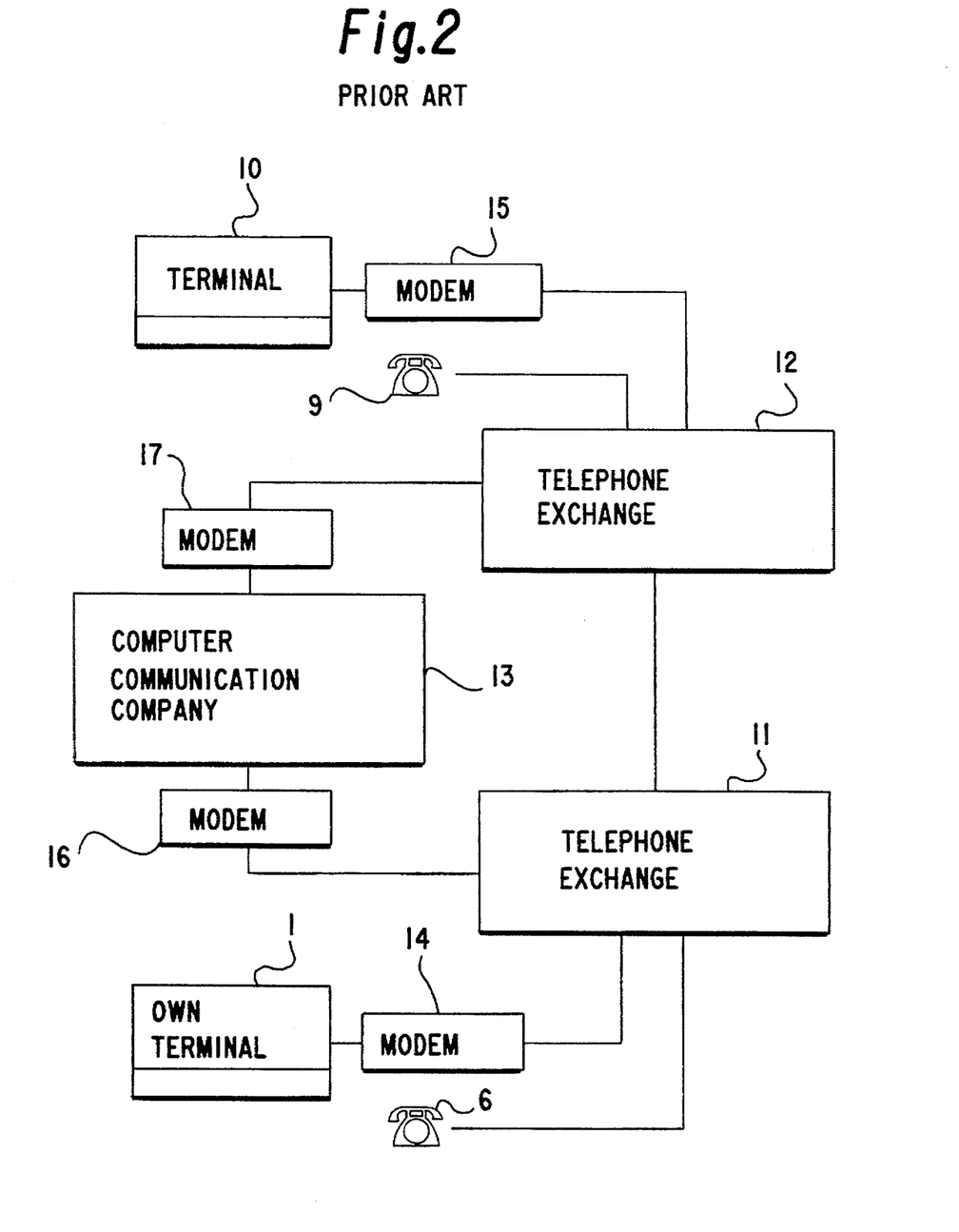
FIG. 2 is a block diagram of another example of a conventional electronic mail system using a telephone system.

FIG. 2 shows another example of a conventional electronic mail system using a telephone system. In FIG. 2, reference numeral 1 denotes a first terminal (own terminal), 6 denotes a first telephone, 9 denotes a second telephone, 10 denotes a second terminal (remote terminal), 12 and 11 denote telephone company exchanges, 13 denotes a computer communication company, and 14 to 17 denote modems (modulators/demodulators) used to interface a computer with a telephone line.

In this system as shown in FIG. 2, when electronic mail (text mail) is transmitted from a user at terminal 10, the modem 15 converts the computer's binary code into a form that can be transmitted by telephone line. The electronic mail converted into a form of the telephone signal is transmitted to the computer communication company 13 via the telephone exchange 12 of the telephone company, and converted again to the computer's binary code by the modem 17 and stored by the computer communication company 13. When a user at the first terminal 1 contacts to the computer communication company 13, the computer communication company 13 informs the user at the first terminal 1 that electronic mail is available. When the user at the first terminal 1 send a password to the communication company 13, the stored electronic mail is transmitted via the modem 16, the telephone exchange 11 of the telephone company, and the modem 14 and is received by the first terminal 1, after being converted into the form of the telephone signal by the modem 16 and restored to the computer's binary code by the modem 14.

Figure 3:
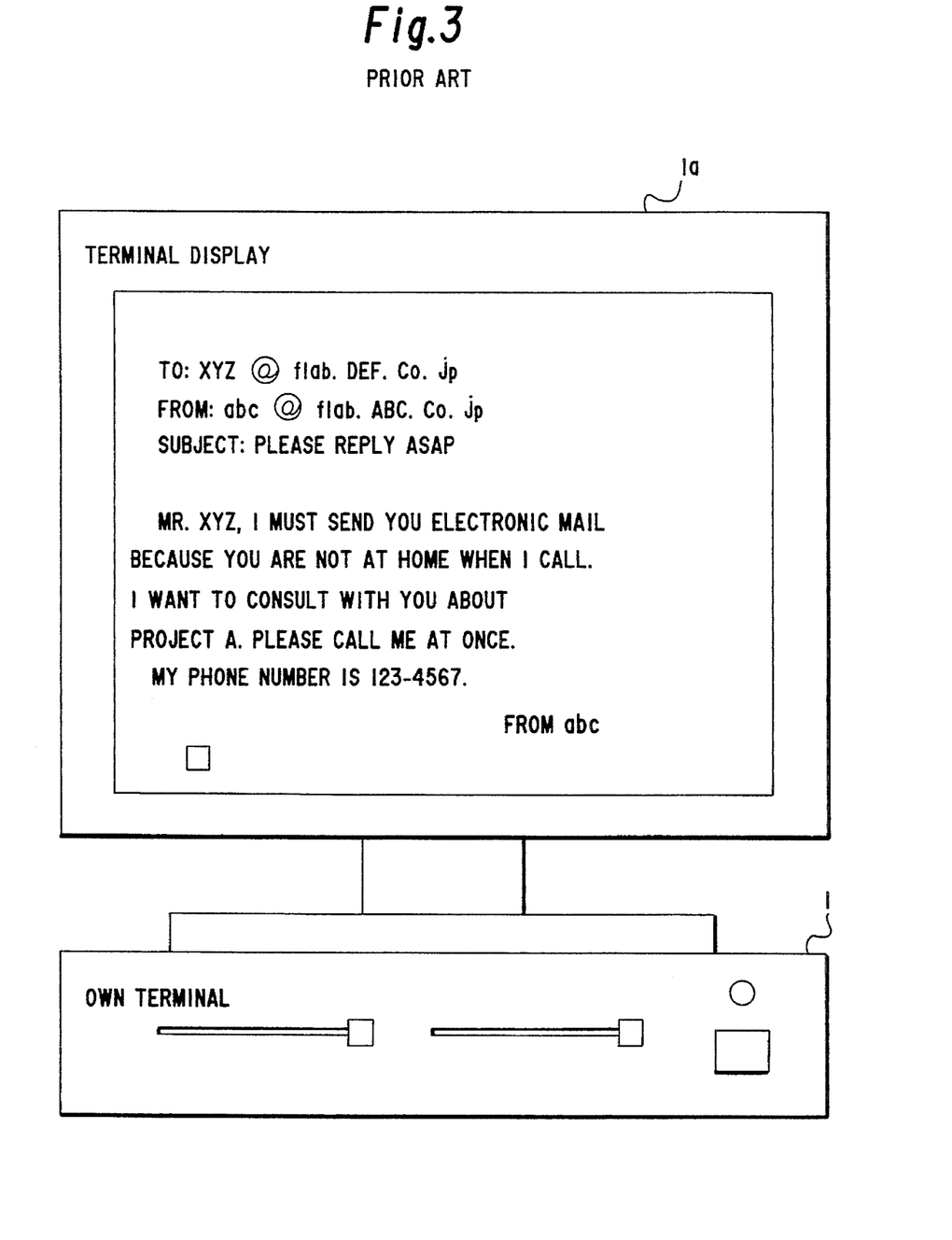
FIG. 3 shows one example of an electronic mail displayed on the terminal display.

FIG. 3 shows an example of electronic mail displayed on the display terminal 1a of the first terminal 1.

The receiver of the electronic mail dials the sender's telephone number after reading the telephone number written in the electronic mail displayed on the terminal display 1a. That is, the receiver of the electronic mail at the first terminal 1 dials from telephone 6 to call the second telephone 7 in FIG. 1 or the second telephone 9 in FIG. 2, and discusses the contents of the electronic mail via a voice telephone service.

However, above-described system has the following problems: the receiver of the electronic mail has to dial the telephone number of the sender after reading the number thereof when the receiver wants to reply to the sender, which is troublesome; and sometimes inconveniences an unknown person by dialing a wrong number.

SUMMARY OF THE INVENTION

The object of the present invention is to provide a computer which can link electronic mail functions with telephone functions, by which a telephone connection from the receiver of the electronic mail to the sender can be automatically achieved, when the receiver wants to reply to the sender, by using a part of the data in the electronic mail.

According to the first aspect of the present invention, there is provided a computer linked with a terminal display and an input means such as a keyboard being able to transmit and receive electronic mail by using a transmitting and receiving means for transmitting and receiving electronic mail; a random access memory for storing received electronic mail; and a display control means for displaying the contents of electronic mail stored in the memory which is provided in the computer, to which a link with a telephone exchange is added for automatically connecting an own telephone to the telephone of a sender of electronic mail by using part of the data in the received electronic mail when a telephone connection request is input to the computer, the link comprising:

a telephone-connection-request-receiving means for outputting a telephone-connection-operation signal when address data indicating a telephone number of the sender is in the electronic mail and a telephone connection request is input to the computer; a first read-out means activated by the telephone connection request receiving means for reading the telephone number of the sender of the electronic mail from the random access memory in accordance with the indicated address; a read only memory for storing the own telephone number previously set therein; a second read-out means activated by the telephone connection request receiving means for reading out the own telephone number from the read only memory; a telephone exchange interface controlling means for Outputting a request signal for connecting the own telephone and the sender's telephone, including the sender's telephone number, from the first read-out means through the telephone connection request receiving means and the own telephone number from the second read-out means through the a telephone connection request receiving means; and a telephone-exchange interface for controlling a telephone exchange to connect the own telephone and the sender's telephone when the request signal is input from the telephone exchange interface controlling means.

According to the second aspect of the present invention, there is provided a computer with a link function comprising: a telephone-connection-request-receiving means for outputting a telephone-connection-operation signal when address data indicating the telephone number of the sender in the electronic mail and a telephone connection request is input to the computer; another random access memory for storing telephone numbers corresponding to an electronic-mail-identification code; a first read-out means activated by the telephone-connection-request-receiving means for retrieving the electronic mail identification code in the random access memory for storing received electronic mail and reading out the telephone number of the sender of the electronic mail from the another random access memory in accordance with the electronic mail identification code; a read only memory for storing an own telephone number previously set therein; a second read-out means activated by the telephone-connection-request-receiving means for reading out the own telephone number from the read only memory; a telephone exchange interface controlling means for outputting a request signal for connecting the own telephone and the sender's telephone, including the sender's telephone number from the first read-out means through the telephone-connection-request-receiving means and the own telephone number from the second read-out means through the telephone connection request receiving means; and a telephone exchange interface for controlling a telephone exchange to connect the own telephone and the sender's telephone when the request signal is input from the telephone exchange interface controlling means.

Further, according to the third aspect of the present invention, there is provided the computer with a link function comprising: a telephone-connection-request-receiving means for outputting a telephone-connection-operation signal when address data indicating the telephone number of the sender in the electronic mail and a telephone connection request are input to the computer; a first read-out means activated by the telephone-connection-request-receiving means for outputting a request signal to retrieve the telephone number of the sender of the electronic mail; a retrieving means activated by the first read-out means for retrieving the telephone number of the sender of the electronic mail from the electronic mail stored in the random access memory; a read Only memory for storing an own telephone number previously set therein; a second read-out means activated by the telephone-connection-request-receiving means for reading out the own telephone number from the read only memory; a telephone exchange interface controlling means for outputting a request signal for connecting the own telephone and the sender's telephone, including the sender's telephone number, from the first read-out means through the a telephone-connection-request-receiving means, and outputting the own telephone number from the second read-out means through the telephone-connection-request-receiving means; and a telephone exchange interface for controlling a telephone exchange to connect the own telephone and the sender's telephone when the request signal is input from the telephone exchange interface controlling means.

In above-constructed computer, the telephone exchange may be a private branch exchange and the telephone of the sender of the electronic mail may be an extension telephone connected to the private branch exchange, or the telephone of the sender of the electronic mail may be connected to a public telephone network.

Further, in above-constructed computer, the transmitting and receiving means for transmitting and receiving electronic mail may be connected to a computer network and the electronic mail may be transmitted or received via a computer network, or may be connected to a telephone line by means of a modem and the electronic mail and transmitted or received via the telephone line.

The computer of the present invention realizes a connection between the telephones of the receiver of the electronic mail and of the sender of the electronic mail automatically when the receiver of the electronic mail wants to reply to the sender of the same. The telephone number of the sender of the electronic mail is obtained by one of the following methods: it is read from the random access memory in which the electronic mail is stored by an indication of the address thereof by the receiver of the electronic mail it is read from the random access memory in which the electronic mail identification code to telephone number relation table is stored by automatic retrieval or it is read from the random access memory in which the electronic mail is stored by the computer.

As a result, the invention realizes a high speed connection of the telephones of the receiver and the sender of electronic mail without manually dialing the telephone.

BRIEF DESCRIPTION OF THE DRAWINGS

The present invention will be more clearly understood from the description as set forth below with reference to the accompanying drawings, wherein.

DESCRIPTION OF THE PREFERRED EMBODIMENT

A preferred embodiment according to the present invention will be explained hereinafter with reference to the attached drawings.

Figure 4:
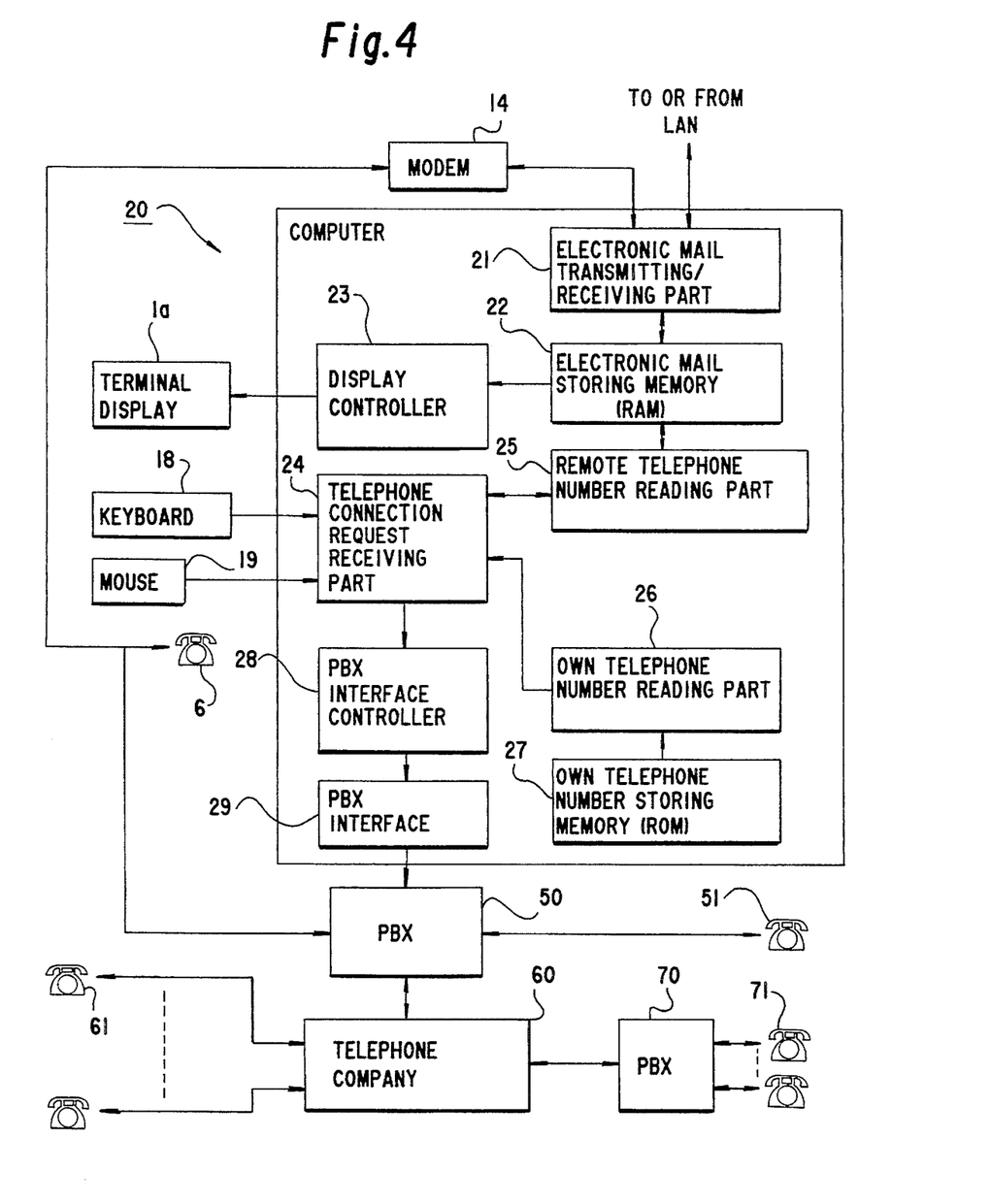
FIG. 4 is a block diagram showing a fundamental construction of the computer having a function of linking an electronic mail system with a telephone system according to the first embodiment of the present invention.

FIG. 4 is a block diagram showing a fundamental construction of the computer 20 according to the first embodiment of the present invention having a function of linking an electronic mail system with a telephone system. The first embodiment is used when the received electronic mail includes a telephone number of the sender of the mail, and the receiver can point out the position of the sender's telephone number on the terminal display using a cursor or the like when the receiver wants to reply to the sender.

The computer 20 is connected to a terminal display 1a and an input means such as a keyboard 18 and a mouse 19 and is able to transmit and receive an electronic mail. The computer 20 is equipped with electronic mail transmitting and receiving part 21 for transmitting and receiving electronic mail; an electronic mail storing memory (random access memory) 22 for storing received electronic mail; and a display controller 23 for displaying the contents of the electronic mail stored, in the memory 22, on the terminal display 1a.

In this embodiment, the electronic mail transmitting and receiving part 21 is connected to a computer network such as a LAN (Local Area Network) and is also connected to a telephone line by means of modem 14. Accordingly, electronic mail can be transmitted or received via the computer network or via the telephone line.

In addition to the basic construction described above, a link to a telephone exchange is added to the computer 20. The link in this first embodiment comprises a telephone connection request receiving part 24, a remote-telephone-number-reading part 25, an own-telephone-number-reading part 26, own-telephone-number-storing memory 27, a FBX-interface controller 28, and a PBX interface.

The telephone-connection-request-receiving part 24 is connected to the keyboard 18, the mouse 19, and the electronic mail storing memory 22 via the remote telephone number reading part 25, to the own-telephone-number-storing memory 27 via the own-telephone-number-reading part, and to the PBX (private branch exchange) interface 29 via the PBX interface controller 28. The PBX interface 29 is connected to the PBX 50 provided outside the computer 20.

In this embodiment, the own (i.e. receiver) telephone 6 is connected to the PBX 50, that is, the own telephone 6 is an extension telephone 51 of the PBX 50. The PBX 50 is connected to the public telephone company equipment 60 to which other subscriber's telephone 61 and other PBXs 70, having extension telephones 71, are connected.

Accordingly, electronic mail may be received at the electronic mail transmitting and receiving part 21 by following routes ① from the LAN
② from the extension telephone 51 of the PBX 50;
③ from the subscriber's telephone 61 on the telephone company network 60; and
④ from the extension telephone 71 of the PBX 70.

The received electronic mail is stored in the electronic mail storing memory 22 and the contents thereof are displayed on the terminal display 1a by means of the display controller 23.

The telephone-connection-request-receiving part 24 receives a request for telephone connection output from the key board 18 or the mouse 19, or receives address data, indicating a sender's telephone number from the electronic mail, which was selected by the cursor.

The remote telephone number reading part 25 is activated by the telephone connection request receiving part 24 to read the telephone number of the sender of the electronic mail from the electronic mail storing memory 22 in accordance with the indicated address. The own-telephone-number-reading part 26 is also activated by the telephone connection request receiving part 24 to read the own (i.e. receiver) telephone number from the own (i.e. receiver) telephone number storing memory 27. The own telephone number is previously stored in the own-telephone-number-storing memory 27.

The PBX interface controller 28 is activated by the telephone connection request receiving part 24 to output a request signal for connecting the own telephone 6 and the sender's telephone 51, 61, or 71 to the PBX interface 29. The request signal from the PBX interface controller 28 to the PBX interface 29 includes the sender's telephone number read out by the remote telephone number reading part 25 and the own telephone number read by the own telephone number reading part 26.

The PBX interface 29 controls the PBX 50 to connect the own telephone 6 and the sender's telephone 51, 61, or 71 when the request signal is input from the PBX interface controller 28.

Figure 5A:
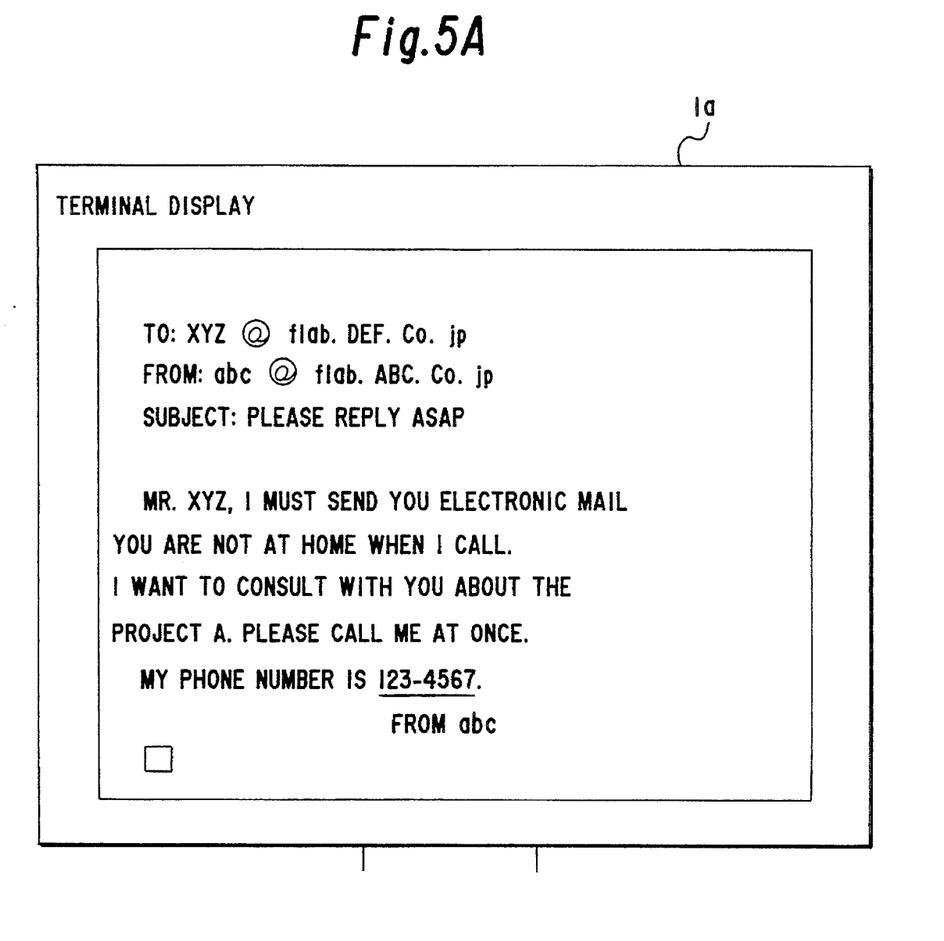
FIG. 5A shows a terminal display displaying a received electronic mail having a sender's telephone number therein.

FIG. 5A shows the enlarged terminal display 1a displaying the electronic mail received by the electronic mail transmitting and receiving park 21 and stored in the electronic mail storing memory 22, in which a sender's telephone number is written. The sender's telephone number is underlined in FIG. 5A.

Figure 5B:
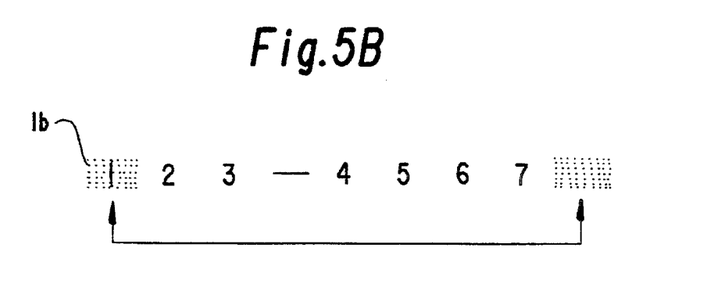
FIG. 5B is an enlarged sender's telephone number in FIG. 5A showing a designation of the number with a cursor of the computer.

When the receiver of the electronic mail as shown in FIG. 5A wants to reply to the sender, the receiver selects the telephone number by using a cursor on the terminal display 1a. FIG. 5B is an enlargement of the sender's telephone number shown in FIG. 5A explaining the selection of the telephone number with the cursor 1b. For example, the receiver first moves the cursor 1b to the first numeral and clicks the mouse button and then moves the cursor 1b to the position beyond to the last numeral and again clicks the mouse button to select the telephone number. The telephone connection request receiving part 24 uses the selected number as a telephone number.

Figure 6:
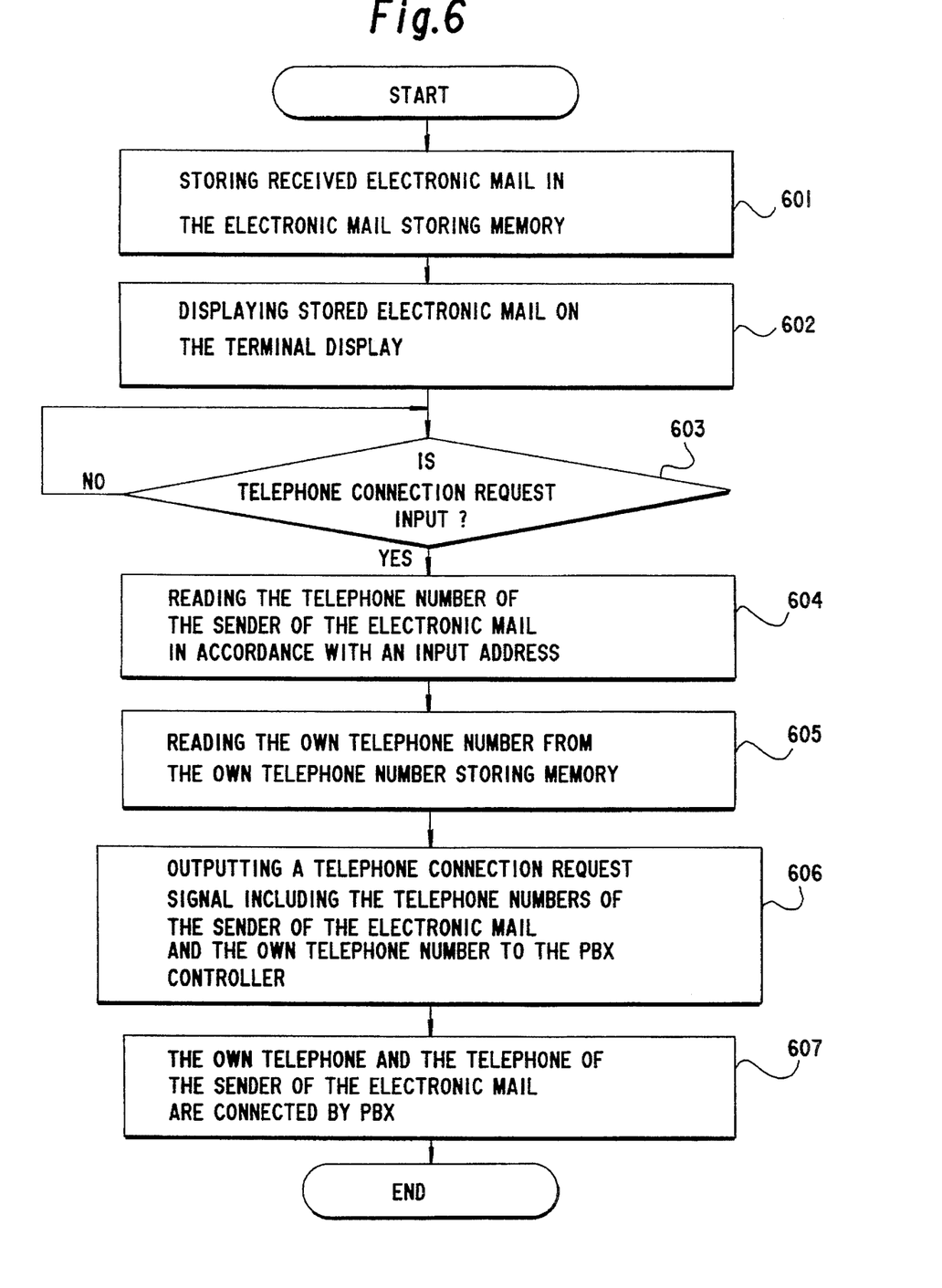
FIG. 6 is a flowchart showing an operation of the computer as shown in FIG. 4.

FIG. 6 is a flowchart explaining an operation of the computer 20 in FIG. 4 when the electronic mail is received.

When an electronic mail is received by the electronic mail transmitting and receiving part 21, storing the received electronic mail in the electronic mail storing memory 22 is executed at step 601. The display controller 23 then displays the stored electronic mail on the terminal display 1a at step 602.

At step 603, it is determined whether or not the telephone connection request is input from an operator (a receiver of the electronic mail). If the operator wants to reply to the sender of the mail, the operator detects the telephone number of the sender, and move the cursor to designate the telephone number as explained in FIG. 5B.

When the telephone connection request and the telephone number of the sender is input to the telephone connection request receiving part 24, the remote telephone number reading part 25 is activated to read the telephone number of the mender of the electronic mail from the electronic mail storing memory 22 in accordance with the selected telephone number at step 604. Then the own telephone number reading part 26 is activated to read the own telephone number from the own telephone number storing memory 27 at step 605. The order of steps 604 and 605 can be reversed.

When the telephone numbers of the sender and the receiver have been read, the telephone connection request receiving part 24 outputs a telephone connection request signal, including the telephone numbers of the sender of the electronic mail and the own telephone number, to the PBX interface controller 28 at step 606. The PBX interface controller 28 controls the PBX interface 29 to connect the own telephone to the telephone of the sender of the electronic mail. Then, the own telephone 6 and the telephone of the sender of the electronic mail are connected by the PBX at step 607.

In this way the telephone 6 of the receiver of the electronic mail and the telephone 51, 61, or 71 at the sender are automatically connected by the computer 20.

Figure 7:
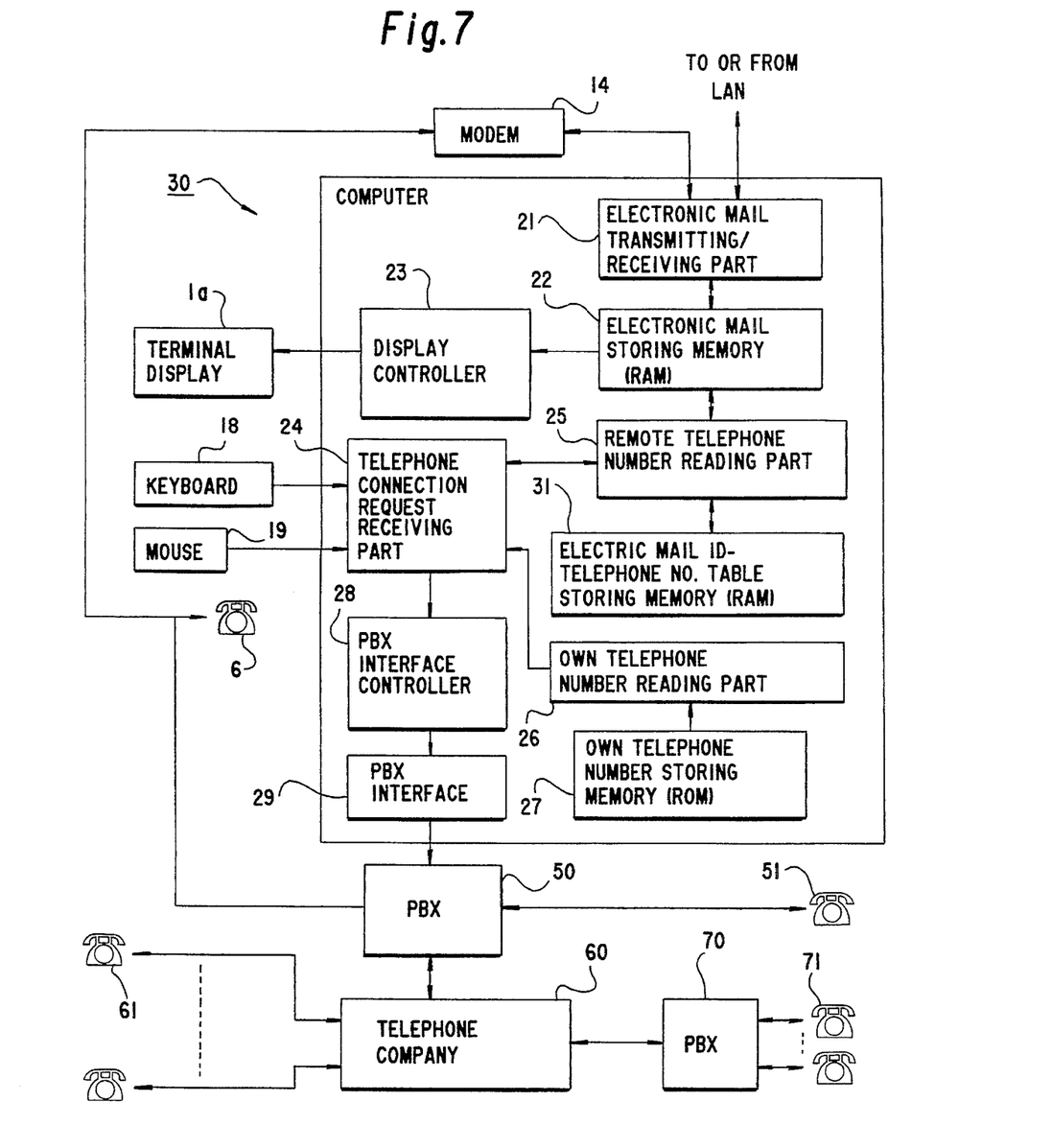
FIG. 7 is a block diagram showing a fundamental construction of the computer having a function of linking an electronic mail system with a telephone system according to the second embodiment of the present invention.

FIG. 7 is a block diagram showing a fundamental construction of the computer 30, according to the second embodiment of the present invention, which can link an electronic mail system with a telephone system. The second embodiment used when the received electronic mail does not includes the telephone number of the sender of the electronic mail, and the receiver cannot find the sender's telephone number in the electronic mail.

The construction of the computer 30 according to the second embodiment is almost the same as the construction of the computer 20 except a memory 31 for storing an electronic mail ID code to telephone numbers table (index) is added. Accordingly, the same parts as explained in FIG. 4 are assigned the same reference numerals in FIG. 7 and the explanation thereof are omitted.

Figure 8A:
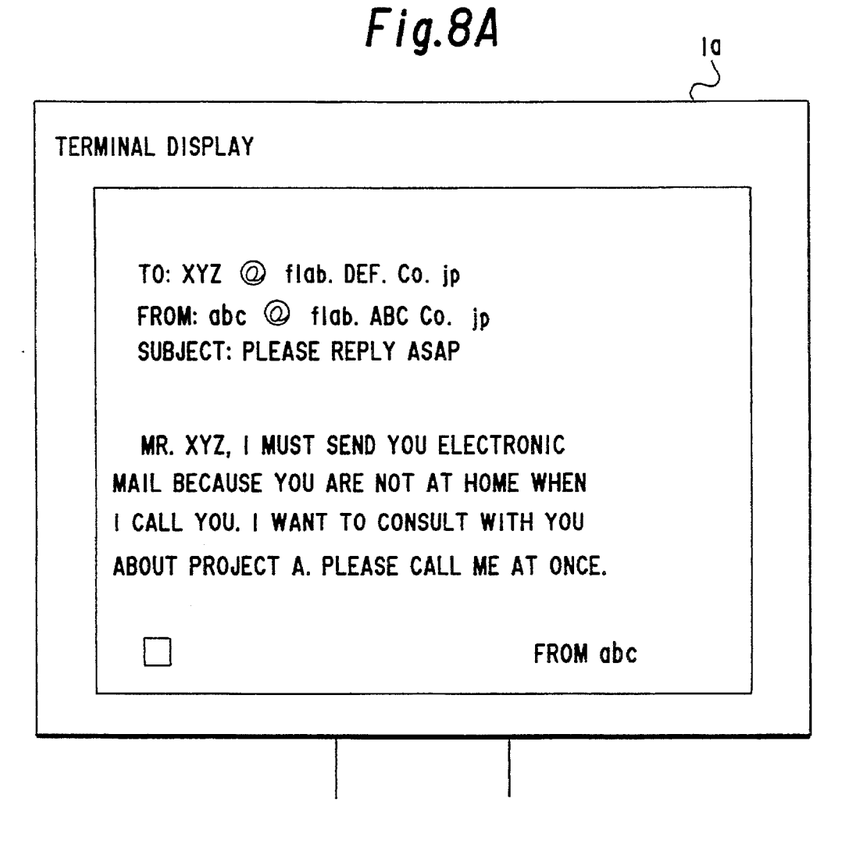
FIG. 8A shows a terminal display displaying a received electronic mail having no sender's telephone number therein.

FIG. 8A shows a terminal display 1a displaying received electronic mail, in which there is no sender's telephone number. Usually, if there is no sender's telephone number in the received electronic mail, the receiver cannot contact the sender. As a countermeasure to this, the electronic mail ID code to telephone numbers table (index) storing memory 31 is connected to the remote telephone number reading part 25 in addition to the construction of the computer 20 as described above in this embodiment.

Figure 8B:
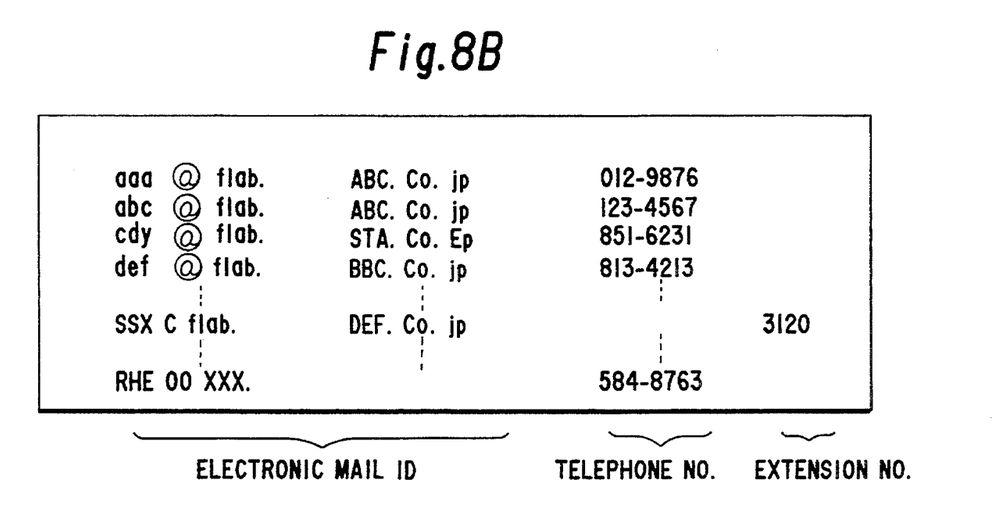
FIG. 8B shows a table indicating an electronic ID to telephone number index stored in the random access memory in FIG. 7.

FIG. 8B shows one example of the electronic mail ID code to telephone number table (index) stored in the memory 31. In electronic mail system, a sender has a list of receivers and electronic mail ID codes. Accordingly, it is possible to make a comparison table between the receiver ID and the corresponding telephone number as shown in FIG. 8B.

The telephone connection request receiving part 24 receives a request for a telephone connection output from the keyboard 18 or the mouse 19, or receives name of a addresser (sender's name) in the electronic mail which is selected by the cursor.

The remote telephone number reading part 25 is activated by the telephone connection request receiving part 24 to retrieve the telephone number of the sender of the electronic mail from the electronic mail ID code to telephone numbers table storing memory 31 in accordance with the name of the sender.

Figure 9:
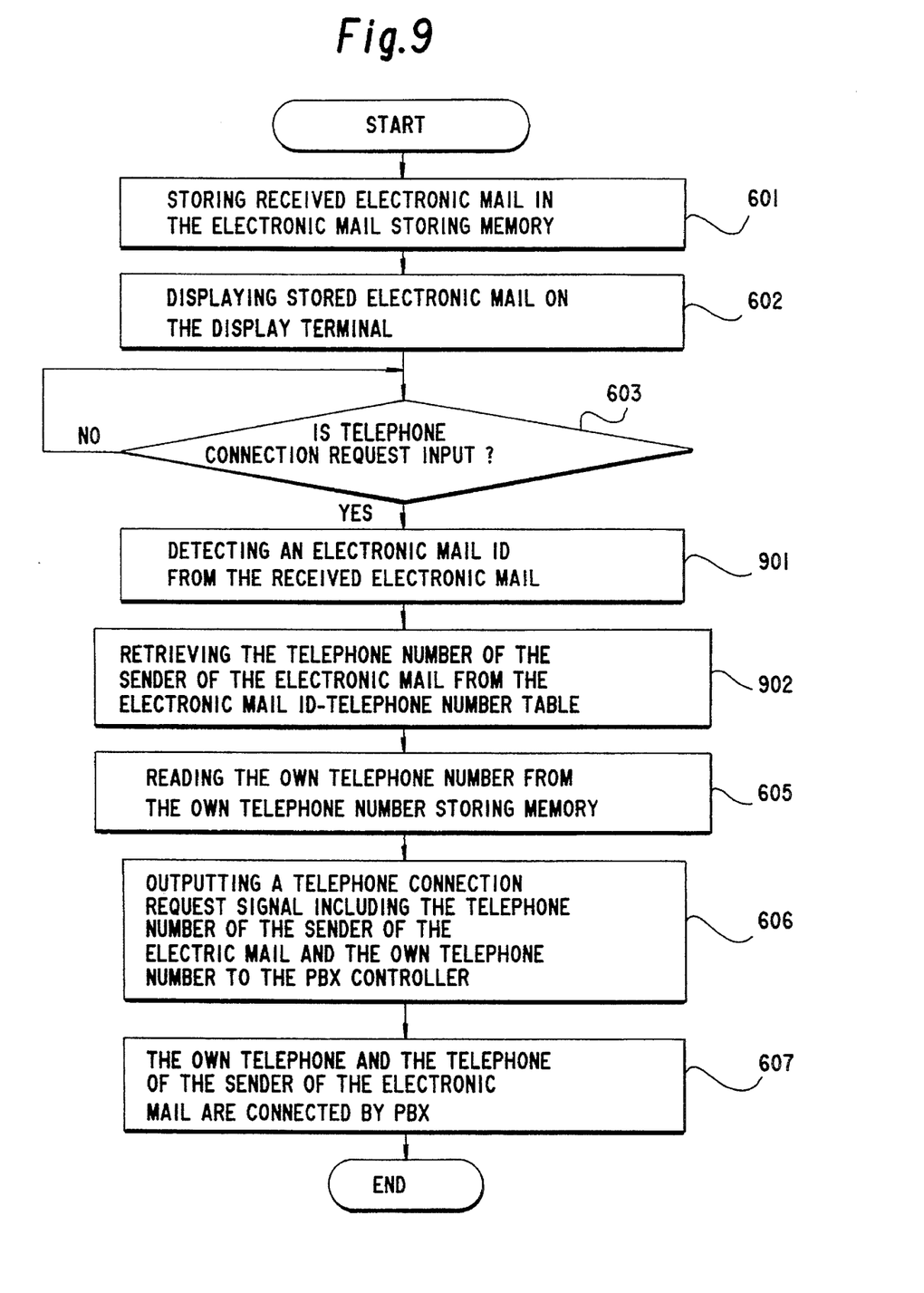
FIG. 9 is a flowchart showing an operation of the computer as shown in FIG. 7.

FIG. 9 is a flowchart explaining the operation of the computer 30 in FIG. 7 when the electronic mail is received. In FIG. 9, the same steps as explained in FIG. 6 are assigned the same reference numerals.

When an electronic mail is received by the electronic mail transmitting and receiving part 21, storing the received electronic mail in the electronic mail storing memory 22 is executed at step 601. Then the display controller 23 displays the stored electronic mail on the terminal display 1a at step 602.

At step 603, it is determined whether or not the telephone connection request is input from an operator (the receiver of the electronic mail). If the operator wants to reply to the sender of the mail, the operator inputs a telephone connection request via the keyboard 18 or the mouse 19.

Then the operator detects the sender of the mail, and moves the cursor to select the name of the sender in the same way as the telephone number was selected in FIG. 5B at step 902. This step may be executed automatically by the remote telephone number reading part 25.

When the telephone connection request and the name of the sender are input to the telephone connection request receiving part 24, the remote telephone number reading part 25 is activated to retrieve the telephone number of the sender of the electronic mail from the electronic mail ID code to telephone numbers table storing memory 31 in accordance with the name of the sender at step 902. For example, the telephone number "123-4567" is indexed to the ID code "bc@flab. ABC. Co. jp".

Then the own (i.e. receiver) telephone number reading part 26 is activated to read the own (i.e. receiver) telephone number from the own (i.e. receiver) telephone number storing memory 27 at step 605. The order of steps 902 and 605 can be reversed.

When the telephone numbers of the sender and the receiver are obtained, the telephone connection request receiving part 24 outputs a telephone connection request signal including the telephone numbers of the sender of the electronic mail and the own telephone number to the PBX interface controller 28 at step 606. The PBX interface controller 28 controls the PBX interface 29 to connect the own telephone to the telephone of the sender of the mail. Then, the own telephone 6 and the telephone of the sender of the electronic mail are connected by PBX at step 607.

In this way the telephone 6 of the receiver of the electronic mail and the telephone 51, 61, or 71 are automatically connected by the computer 20.

Figure 10:
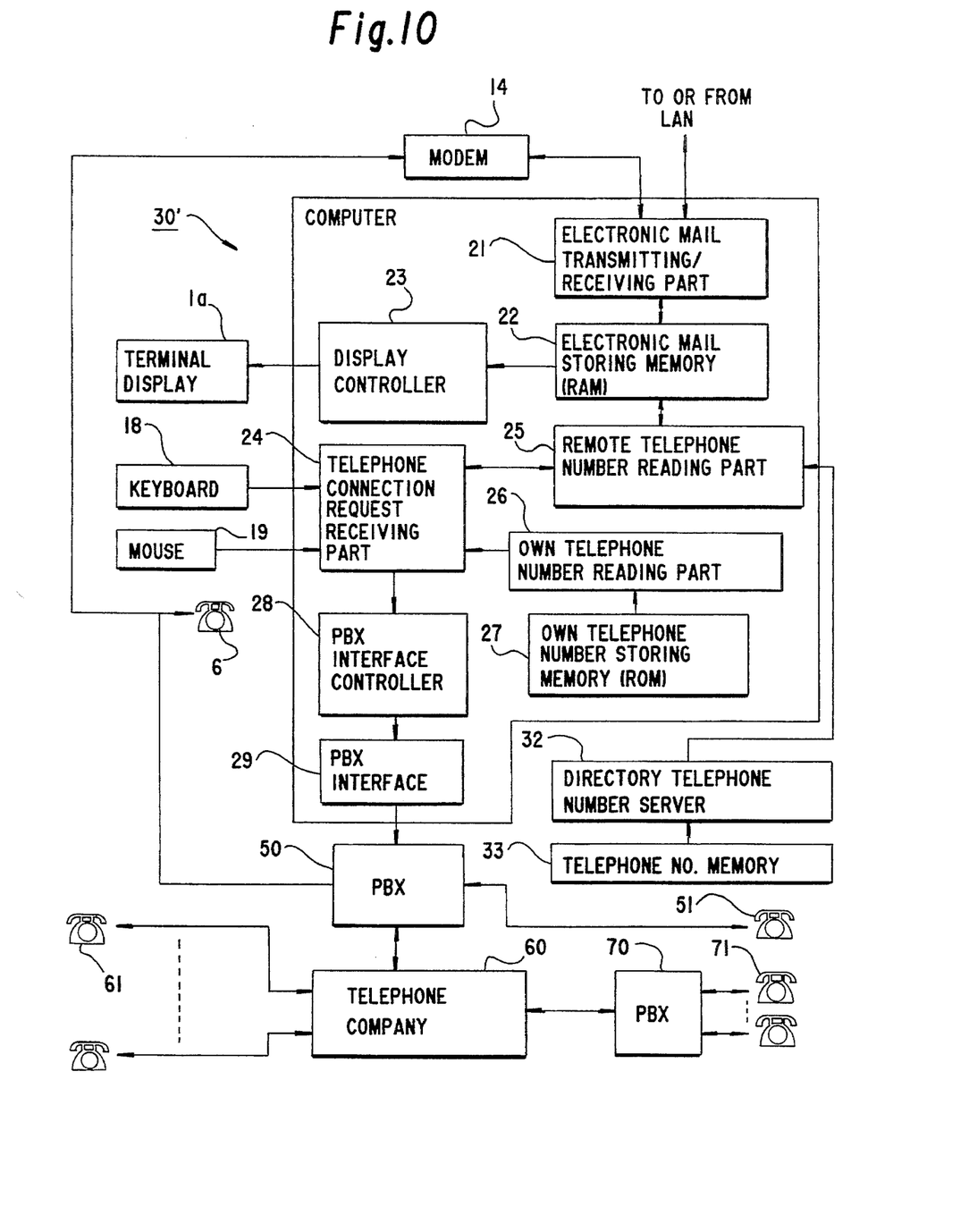
FIG. 10 is a block diagram showing a modified construction of the computer having a function of linking an electronic mail system with a telephone system according to the second embodiment of the present invention.

FIG. 10 is a block diagram showing a modified construction of the computer 30' which can link an electronic mail system with a telephone system according to the second embodiment of the present invention. The difference between the computer 30 and 30' is the position of the electronic mail ID to telephone number table storing memory 31. The position of the electronic mail ID to telephone number table storing memory 31 is provided outside of the computer 30' as a directory telephone number server 32 and telephone number memory 33 in FIG. 10, although it is provided inside of the computer 30 in FIG. 7. The modified construction of the computer 30' may be adopted when the electronic mail ID to telephone number table storing memory 31 is too large to install in the computer 30'.

Figure 11:
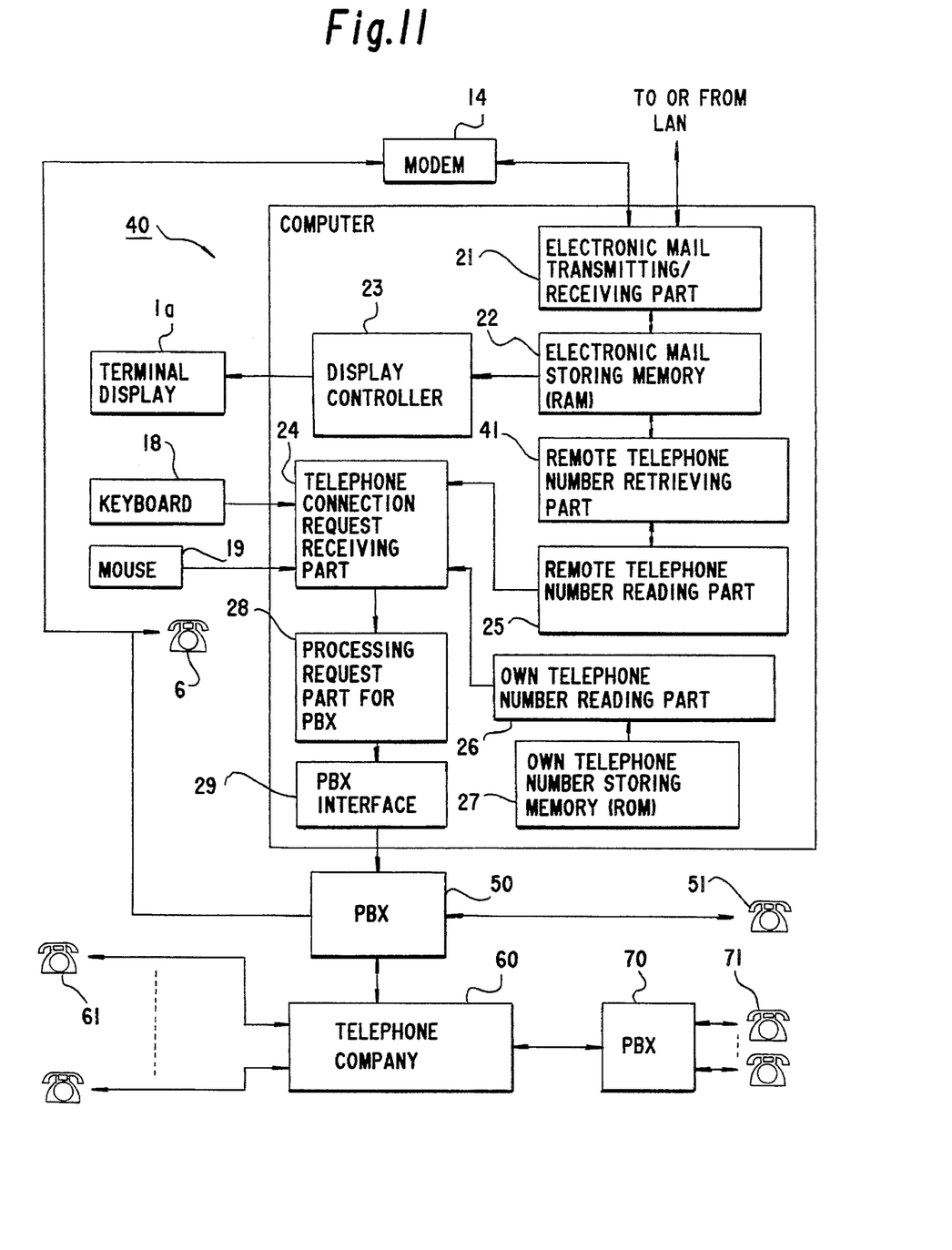
FIG. 11 is a block diagram showing a fundamental construction of the computer having a function of linking an electronic mail system with a telephone system according to the third embodiment of the present invention.

FIG. 11 is a block diagram showing a fundamental construction of the computer 40, according to the third embodiment of the present invention which is able to link an electronic mail system with a telephone system. The third embodiment is used when the received electronic mail includes the telephone number of the sender of the mail. Accordingly, the displayed electronic mail on the terminal display 1a is the same as shown in FIG. 5A.

Construction of the computer 40 according to the third embodiment is almost the same as the construction of the computer 20 except a retrieval part of remote telephone number is added between the electronic mail storing memory 22 and the remote telephone number reading part 25. Accordingly, the same parts as explained in FIG. 4 are assigned the same reference numerals in FIG. 11 and the explanation thereof are omitted.

The difference between the first and the third embodiments is that the receiver of the electronic mail has to select the telephone number of the sender of the mail by means of moving the cursor 1b on the terminal display in the first embodiment when the receiver wants to reply to the sender but the telephone number of the sender of the mail is automatically retrieved by the computer 40 in the third embodiment.

An algorithm for retrieving the telephone number of the sender of the electronic mail is, for example, "a row of numerals having four or more digits, and no characters are inserted between the digits '-' or ','".

Figure 12:
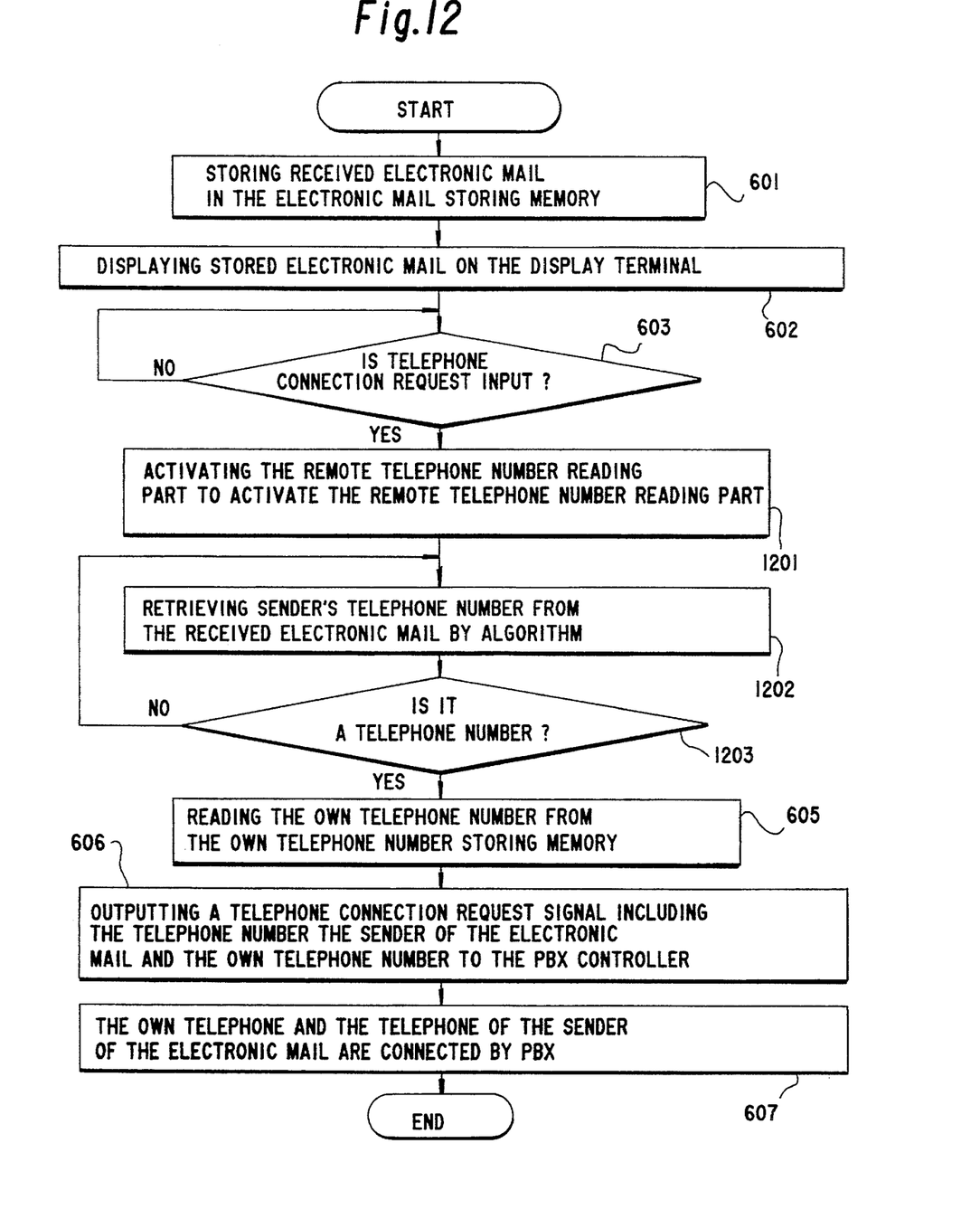
FIG. 12 is a flowchart showing an operation of the computer as shown in FIG. 11.

FIG. 12 is a flowchart showing an operation of the computer 40 in FIG. 11 when the electronic mail is received.

When electronic mail is received by the electronic mail transmitting and receiving part 21, storing the received electronic mail in the electronic mail storing memory 22 is executed at step 601. Then the display controller 23 displays the stored electronic mail on the terminal display 1a at step 602.

At step 603, it is determined whether or not a telephone connection request is input from an operator (a receiver of the electronic mail). If the operator wants to reply to the sender of the mail, the operator inputs a telephone connection request via the keyboard 18 or the mouse 19.

When the telephone connection request is input to the telephone connection request receiving part 24, the remote telephone number reading part 25 is activated, and then the remote telephone number retrieving part 41 is activated by the remote telephone number reading part 25 at step 1201. The remote telephone number retrieving part 41 then retrieves the telephone number of the sender of the electronic mail from the electronic mail storing memory 22 in accordance with the above-described algorithm at step 1202.

At step 1203, it is determined whether or not the retrieved number is a telephone number. If the retrieved number is not a telephone number, step 1202 is repeated, and if the retrieved number is the telephone number, the control proceeds to step 605.

When the telephone numbers of the sender and the receiver are obtained, the telephone connection request receiving part 24 outputs a telephone connection request signal including the telephone numbers of the sender of the electronic mail and the own telephone number to the PBX interface controller 28 at step 606. The PBX interface controller 28 controls the PBX interface 29 to connect the own (i.e. receiver) telephone to the telephone of the sender of the mail. Then, the own telephone 6 and the telephone of the sender of the electronic mail are connected by PBX at step 607.

In this way the telephone 6 of the receiver of the electronic mail and the telephone 51, 61, or 71 of the sender of the electronic mail are automatically connected by the computer 20.

As is clear from the three embodiments, a telephone of a receiver of the electronic mail can be automatically connected to a telephone of the sender of electronic mail by using a part of data in the received electronic mail when a telephone connection request is input to the computer. As a result, a speed-up of a reply from the receiver to the sender of the mail is realized, a wrong number is not dialed by mistake, and a dialing operation is avoided to reduce the inconvenience to the receiver.

What is claimed is:

1. A computer, linked to a terminal display and an input means such as a keyboard, being able to transmit and receive electronic mail by using a transmitting and receiving means for transmitting and receiving said electronic mail, a random access memory means for storing received electronic mail, and a display control means for displaying contents of said electronic mail, stored in said random access memory means, which are provided in the computer, said computer comprising:

a telephone connection request receiving means for outputting a telephone connection operation signal when an address data, indicating a telephone number of a sender of said electronic mail, and a telephone connection request are input to the computer;

a first read-out means, activated by said telephone connection request receiving means, for reading out said telephone number of said sender of said electronic mail from said random access memory means in accordance with said address data by using part of data in said received electronic mail;

a receiver telephone number memory means for storing a receiver telephone number previously set therein;

a second read-out means, activated by said telephone connection request receiving means, for reading out said receiver telephone number from said receiver telephone number memory means;

a telephone-exchange-interface-controlling means for outputting a request signal for requesting a connection between a receiver telephone and a sender's telephone by using said telephone number of said sender obtained from said first read-out means through said telephone connection request receiving means and said receiver telephone number obtained from said second read-out means through said telephone connection request receiving means; and a telephone exchange interface means for controlling a telephone exchange to connect said receiver telephone and said sender's telephone when said request signal is input from said telephone-exchange-interface-controlling means, wherein said computer links with said telephone exchange for automatically connecting said receiver telephone to said telephone of said sender of said electronic mail by using said part of data in said received electronic mail when said telephone connection request is input to said computer.

2. A computer as set forth in claim 1, wherein the telephone exchange is a private branch exchange and the telephone of the sender of electronic mail is an extension telephone connected to the private branch exchange.

3. A computer as set forth in claim 1, wherein the telephone of the sender of electronic mail is in a public telephone network.

4. A computer as set forth in claim 1, wherein the transmitting and receiving means for transmitting and receiving electronic mail is connected to a computer network and the electronic mail is transmitted or received via said computer network.

5. A computer as set forth in claim 1, wherein the transmitting and receiving means for transmitting and receiving electronic mail is connected to a telephone line by means of modem and the electronic mail is transmitted or received via the telephone line.

6. A computer, linked to a terminal display and an input means such as a keyboard, being able to transmit and receive electronic mail by using a transmitting and receiving means for transmitting and receiving said electronic mail, a first random access memory means for storing received electronic mail, and a display control means for displaying contents of said electronic mail, stored in said first random access memory means, which are provided in the computer, said computer comprising:

a telephone connection request receiving means for outputting a telephone connection operation signal when an address data, indicating a telephone number of a sender of said electronic mail, and a telephone connection request are input to the computer;

a second random access memory means for storing telephone numbers corresponding to electronic mail identification codes;

a first read-out means, activated by said telephone connection request receiving means, for retrieving one of said electronic mail identification codes, from said first random access memory means for storing received electronic mail, and for reading out said telephone number of said sender of said electronic mail from said second random access memory means in accordance with said electronic mail identification code by using a part of data in said received electronic mail;

a receiver telephone number storing memory means for storing a receiver telephone number previously set therein;

a second read-out means, activated by said telephone connection request receiving means, for reading out said receiver telephone number from said receiver telephone number storing memory means;

a telephone-exchange-interface-controlling means for outputting a request signal for requesting a connection between a receiver telephone and a sender's telephone by using said sender's telephone number obtained from said first read-out means through said telephone connection request receiving means and said receiver telephone number obtained from said second read-out means through said telephone connection request receiving means; and a telephone exchange interface means for controlling a telephone exchange to connect said receiver telephone to said sender's telephone when said request signal is input from said telephone-exchange-interface-controlling means, wherein said computer links with said telephone exchange for automatically connecting said receiver telephone to said sender's telephone of said electronic mail by using said part of data in said received electronic mail when said telephone connection request is input to said computer.

7. A computer as set forth in claim 6, wherein the telephone exchange is a private branch exchange and the telephone of the sender of the electronic mail is an extension telephone connected to the private branch exchange.

8. A computer as set forth in claim 6, wherein the telephone of the sender of the electronic mail is in a public telephone network.

9. A computer as set forth in claim 6, wherein the transmitting and receiving means for transmitting and receiving electronic mail is connected to a computer network and the electronic mail is transmitted or received via said computer network.

10. A computer as set forth in claim 6, wherein the transmitting and receiving means for transmitting and receiving an electronic mail is connected to a telephone line by means of modem and the electronic mail is transmitted or received via the telephone line.

11. A computer as set forth in claim 6, wherein the telephone exchange is a private branch exchange and the telephone of the sender of the electronic mail is an extension telephone connected to the private branch exchange.

12. A computer, linked to a terminal display and an input means such as a keyboard, being able to transmit and receive electronic mail by using a transmitting and receiving means for transmitting and receiving said electronic mail, and random access memory means for storing received electronic mail, and a display control means for displaying contents of said electronic mail, stored in said random access memory means, which are provided in the computer, said computer comprising:

a telephone connection request receiving means for outputting a telephone connection operation signal when an address data, indicating a telephone number of a sender of electronic mail, and a telephone connection request are input to the computer;

a first read-out means, activated by said telephone connection request receiving means, for outputting a request signal to retrieve said telephone number of said sender of said electronic mail by using a part of data in said received electronic mail;

a retrieving means, activated by said first read-out means, for retrieving said telephone number of said sender of said electronic mail from data in said electronic mail which is stored in said random access memory means;

a receiver telephone number storing memory means for storing a receiver telephone number previously set therein;

a second read-out means, activated by said telephone connection request receiving means, for reading out said receiver telephone number from said receiver telephone number storing memory means;

a telephone-exchange-interface-controlling means for outputting a request signal for requesting a connection between a receiver telephone and a sender's telephone by using said sender's telephone number obtained from said first read-out means through said telephone connection request receiving means and said receiver telephone number obtained from said second read-out means through said telephone connection request receiving means; and a telephone exchange interface means for controlling a telephone exchange to connect said receiver telephone and said sender's telephone when said request signal is input from said telephone-exchange-interface-controlling means, wherein said computer links with said telephone exchange for automatically connecting said receiver telephone to said sender's telephone by using said part of data in said received electronic mail when said telephone connection request is input to said computer.

13. A computer as set forth in claim 12, wherein the telephone exchange is a private branch exchange and the telephone of the sender of electronic mail is an extension telephone connected to the private branch exchange.

14. A computer as set forth in claim 12, wherein the telephone of the sender of electronic mail is in a public telephone network.

15. A computer as set forth in claim 12, wherein the transmitting and receiving means for transmitting and receiving electronic mail is connected to a computer network and the electronic mail is transmitted or received via said computer network.

16. A computer as set forth in claim 12, wherein the transmitting and receiving means for transmitting and receiving electronic mail is connected to a telephone line by means of modem and the electronic mail is transmitted or received via the telephone line.

* * * * *